(12) United States Patent
Howell et al.

(10) Patent No.: US 6,353,531 B1
(45) Date of Patent: Mar. 5, 2002

(54) INTEGRATED VISOR FOR A NOTEBOOK COMPUTER

(75) Inventors: Bryan F. Howell; Bryan K. Hunter, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/382,503

(22) Filed: Aug. 25, 1999

(51) Int. Cl.$^7$ .................................................. G06F 1/16
(52) U.S. Cl. ...................... 361/683; 361/679; 361/680; 361/681; 361/683; 361/686; 345/87; 345/102; 345/905; 348/149; 349/65; 349/69; 349/149; 349/150
(58) Field of Search ................................ 361/679–681, 361/683, 686; 345/87, 905, 102; 348/149; 349/65, 69, 149, 150

(56) References Cited

U.S. PATENT DOCUMENTS

| 5,636,102 A | 6/1997 | Fujino et al. |
|---|---|---|
| 5,706,168 A | 1/1998 | Erler et al. |
| 5,777,704 A | 7/1998 | Selker |
| 6,040,811 A * | 3/2000 | Malhi .......................... 345/87 |

* cited by examiner

Primary Examiner—Leo P. Picard
Assistant Examiner—Yean-Hsi Chang
(74) Attorney, Agent, or Firm—Haynes and Boone, LLP

(57) ABSTRACT

A portable computer includes a base having a perimeter including a plurality of sides and a module opening formed in one of the sides. A display panel having a viewing surface is housed by a cover pivotally connected to the base for movement between an open position and a closed position. The cover includes a visor extending in a direction substantially perpendicular to the viewing surface of the display panel, such that the visor covers a portion of the module opening when the cover is in the closed position.

16 Claims, 3 Drawing Sheets

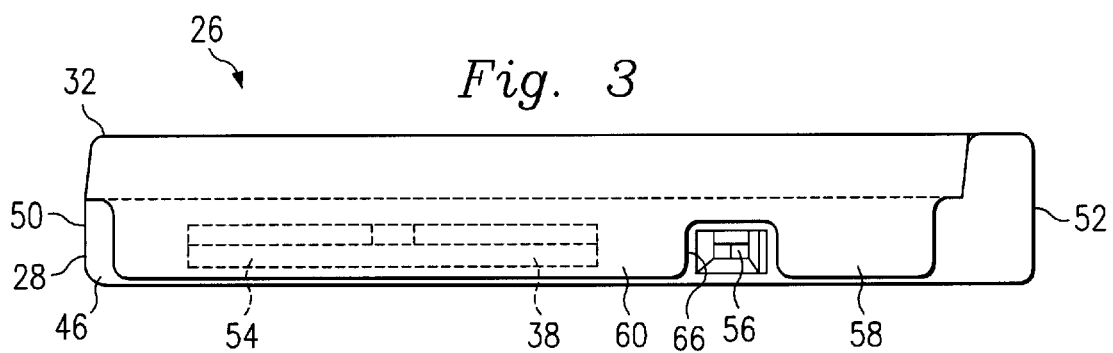
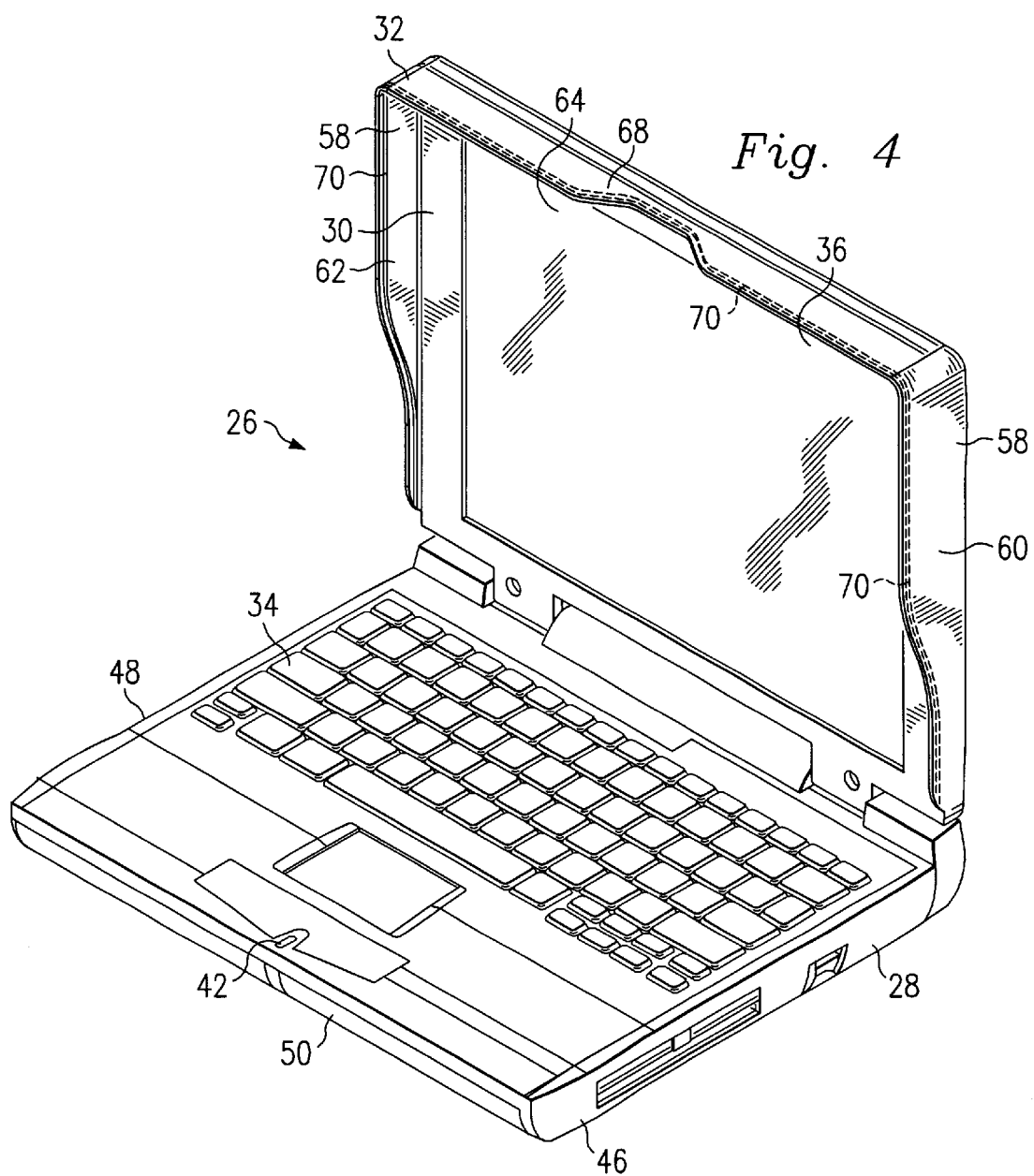

INTEGRATED VISOR FOR A NOTEBOOK COMPUTER

BACKGROUND

The disclosures herein relate generally to portable computers and more particularly to a visor on a top portion of a portable notebook computer.

Portable laptop or notebook computers include a base and a top which is pivotally connected to the base at a hinged connection. When the top is raised, a liquid crystal display (LCD) panel mounted therein is exposed. The portable computer industry is providing computers with larger and larger LCD panels to respond to user demand. Consequently, the strength requirements of the LCD housing are increasing, particularly because portable computers are often dropped or subjected to harsh conditions which may damage the LCD panel or other components of the computer.

There have been several attempts to provide protection for components of portable computers from such damage. U.S. Pat. No. 5,706,168 discloses an improved portable personal computer preferably configured to facilitate outdoor field-use having an impact attenuating case, a sealed keyboard, and a sealed mouse which facilitate use of the computer in harsh environments. The case has an impact attenuating covering in which is housed a hard drive on a shock-isolated mount and a display further mounted in the case in a resilient shock-isolated manner. The case, hard drive mount, and display mount cooperate to attenuate shock-induced damage resulting from impacts and sudden accelerations of the computer caused during rugged use. Furthermore, the sealed keyboard and mouse assemblies prevent any damage which might result from liquids migrating within the case and into the computer components.

Typically, portable laptop computers have at least one module, such as a disk drive, CD ROM drive, modem, or battery pack housed within the base. Many of these modules can be removed by the user to be replaced or interchanged with other modules. However, when a portable computer is dropped, these modules are often unintentionally ejected from the base and are easily damaged. In addition, even when the computer is stationary, foreign material such as dust, dirt, small objects and liquid may get inside the modules and cause damage.

Also, another typical problem associated with portable laptop or notebook computers is a glare or bleaching caused by light hitting the LCD display making it difficult or unpleasant to view the LCD display. Attempting to cure this problem, U.S. Pat. No. 5,777,704 provides an arrangement for enhancing the observability of a multicolored LCD in a computer of the notebook type. A top lid of the laptop is mechanically separated into a diffuser/reflective surface and the LCD in its frame. The diffusing/reflecting lid is attached through a slider and linkage arrangement permitting the diffuser/reflector to act as a flat field illuminator and to move in a plane, apart from, yet forming a dihedral angle with the plane of the LCD. The lid can thus opportunistically reflect ambient light through the plane of the LCD. Also, by projecting over the plane of the LCD, the lid secures a contrast-maintaining shadow otherwise bleached by light incident to the LCD viewing surface.

It would be desirable to provide a portable computer having a simple means for protecting the LCD, modules, and other components of the computer and for reducing the amount of glare on the LCD display. Therefore, what is needed is a portable computer top which provides protection for the computer and reduces the glare on the LCD display.

SUMMARY

One embodiment, accordingly, provides a display panel cover including a visor which provides protection for the computer and reduces glare on the display panel. To this end, a portable computer includes a base having a perimeter including a plurality of sides. A module opening is formed in one of the sides of the base. A display panel having a viewing surface, is housed by a cover pivotally connected to the base for movement between an open position and a closed position. The cover includes a visor extending in a direction substantially perpendicular to the viewing surface of the display panel, such that the visor covers at least a portion of the module opening when the cover is in the closed position.

A principal advantage of this embodiment is that in a portable computer, a visor can be provided to restrain modules within the base of the computer when the computer is dropped for example. Other advantages are that the visor protects the computer from foreign objects, reduces the amount of glare on the display panel, and provides an extra wall of plastic around the base providing increased protection to critical components.

BRIEF DESCRIPTION OF THE DRAWINGS

FIG. 3 is a side view of the portable computer of FIG. 2, with the cover in a closed position.

FIG. 4 is an isometric view illustrating another embodiment of a portable computer including a cover having a visor.

DETAILED DESCRIPTION

Figure 1:
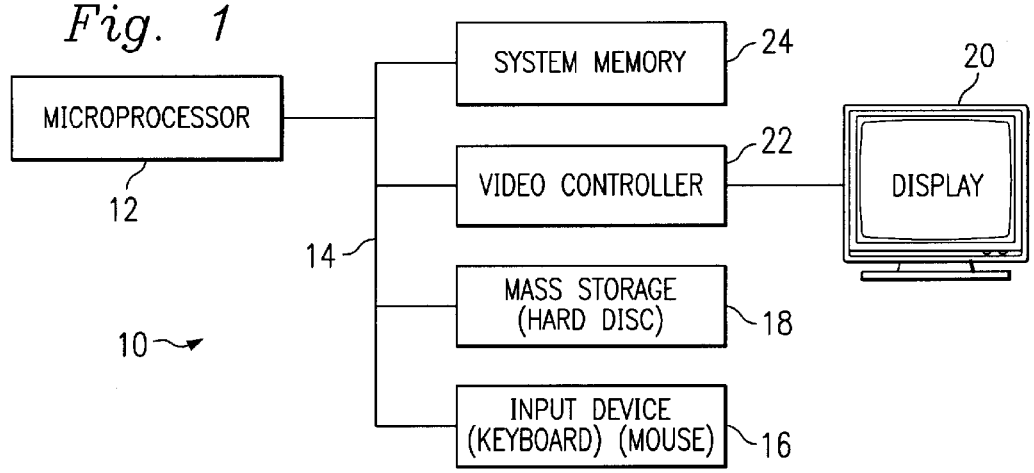
FIG. 1 is a diagrammatic view illustrating an embodiment of a computer system.

In one embodiment, as shown in FIG. 1, computer system 10 includes; a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with a fast storage to facilitate execution of computer programs by microprocessor 12. It should be understood that the other busses and intermediate circuits can be deployed between the components described above and microprocessor 12 to facilitate interconnection between the components and the microprocessor.

Figure 2:
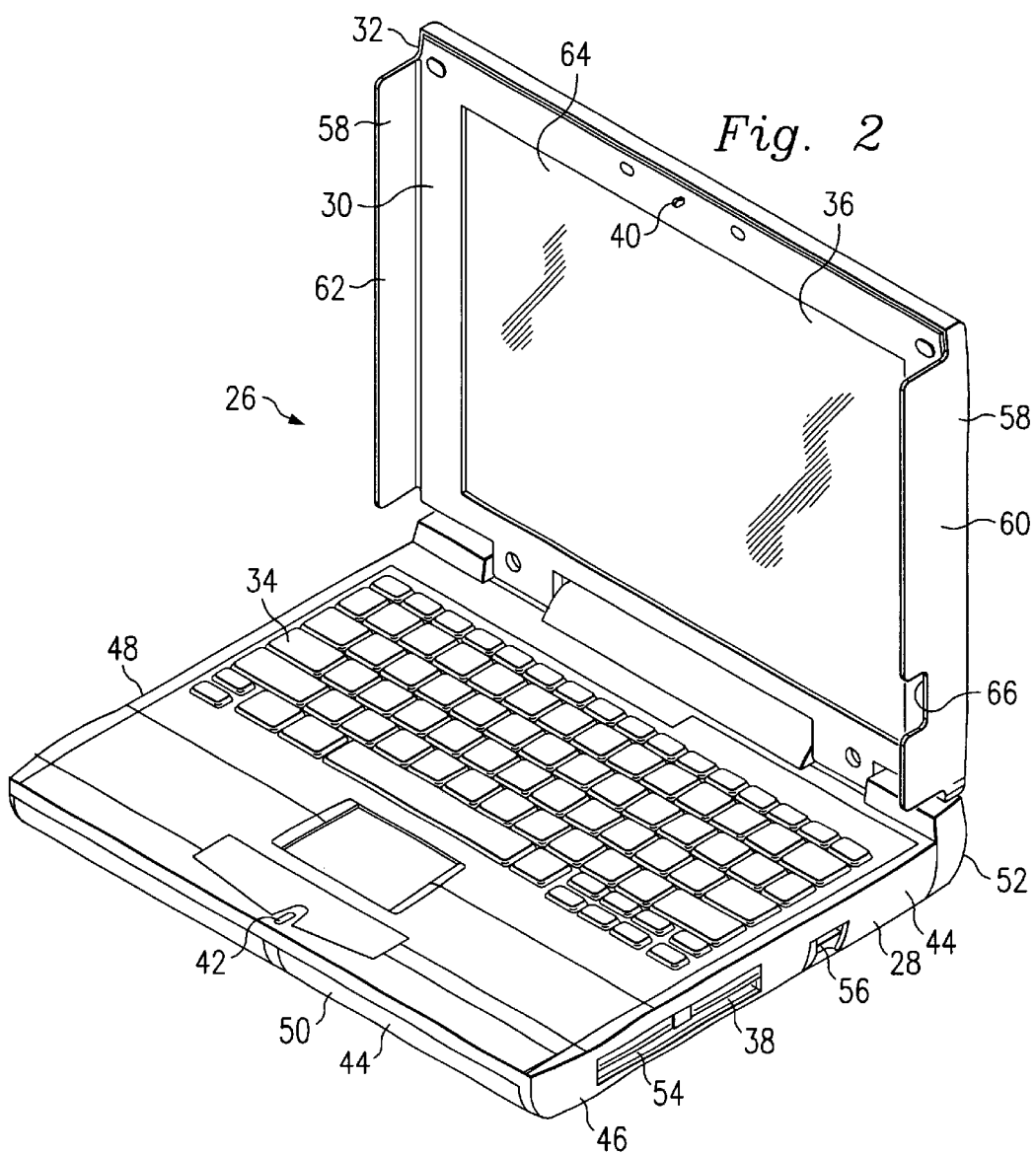
FIG. 2 is an isometric view illustrating an embodiment of a portable computer including a cover having a visor, with the cover in an open position.

As shown in FIG. 2, one embodiment of a portable, notebook size computer 26 comprises a self-contained system such as computer system 10, FIG. 1, and a top or cover 32 pivotally connected to a base 28 for movement between an open position and a closed position. In the open position, a keypad 34 mounted on base 28 and an LCD panel 36, or other suitable panel, mounted in cover 32, are exposed. Typically, cover 32 includes a bezel 30 and a latch hook 40. A latch release device 42 retains latch hook 40 to keep cover 32 engaged with base 28 when the cover 32 is in a closed position.

Base 28 includes a perimeter 44 having a right side 46, as viewed in FIG. 2 a left side 48, a front side 50, and a rear side 52 (see also FIG. 3). At least one module 38 is typically mounted within base 28 such that a first end 54 of the module 38 is flush with side 46, but could be likewise mounted in another one of the sides 48, 50, or 52. Module 38 may be a mass storage device, such as a floppy disk or CD ROM drive, a modem, an expansion card, a battery, or any other computer device. Module 38 may be removable by the user to be replaced or interchanged with other modules.

At least one interface device 56 may also be positioned in side 46. Interface device 56 may be an inlet to receive a plug, wire, or cable; a control device such as a button, switch, or knob; a latch mechanism; or any other such interface device.

Cover 32 also includes a visor 58 located on outer edges of cover 32. In the embodiment shown in FIG. 2, visor 58 includes right flange 60 and left flange 62 extending in a direction substantially perpendicular to an active surface 64 of LCD panel 36. Right flange 60 includes a notch 66 to accommodate interface device 56 when the 16 cover is in a closed position (discussed below). In use, visor 58 may reduce the amount of light directly incident on active surface 64 of LCD panel 36, thus reducing the amount of glare on LCD panel 36.

FIG. 3 is a right side view of the embodiment of the portable computer 26 of FIG. 2 with cover 32 in a closed position. Right flange 60 extends over right side 46 of base 28 and covers at least a portion of the first end 54 of module 38. Similarly, although not shown, left flange 62 extends over left side 48 of base 28. Right flange 60 decreases the risk of module 38 being dislodged from base 28 and easily damaged when portable computer 26 is dropped or otherwise mishandled. Notch 66 accommodates interface device 56 such that interface device 56 remains accessible when cover 32 is closed.

Right and left flanges 60 and 62, FIG. 4 also act as stiffeners which increase the strength of cover 32, reducing the risk of damage to LCD panel 36 when portable computer 26 is dropped, for example. In addition, right and left flanges 60 and 62 enhance protection of module 38, as well as keypad 34, LCD panel 36, and other components of portable computer 26, from foreign material such as dust, dirt, small objects, and liquid. Portable computer 26 may also include a gasket 70 positioned between visor 58 and base 28 when cover 32 is in the closed position. Gasket 70 may be connected to visor 58, or to base 28. Gasket 70 operates to further protect portable computer 26 from foreign materials and liquids. Gasket 70 may be formed of plastic, rubber, or any other suitable material.

In one embodiment, shown in FIG. 4, visor 58 includes right flange 60, left flange 62, and front flange 68. As right flange 60 extends at least partially over right side 46 of base 28 and left flange 62 extends at least partially over left side 48 of base 28, front flange 68 similarly extends over front side 50 of base 28 when cover 32 is in the closed position. Front flange 68 operates in conjunction with right and left flanges 60 and 62 to further reduce the glare on LCD panel 36, increase the strength of cover 32, and protect portable computer 26 from foreign materials.

In the embodiments shown in FIGS. 2 and 3, visor 58 is an integral part of bezel 30. In another embodiment (not shown), visor 58 and bezel 30 may be separate components. In a further embodiment (not shown), visor 58 may be removed from and reattached to cover 32. Visor 58 may be formed of plastic, metal, or any other suitable material.

Figure 5:
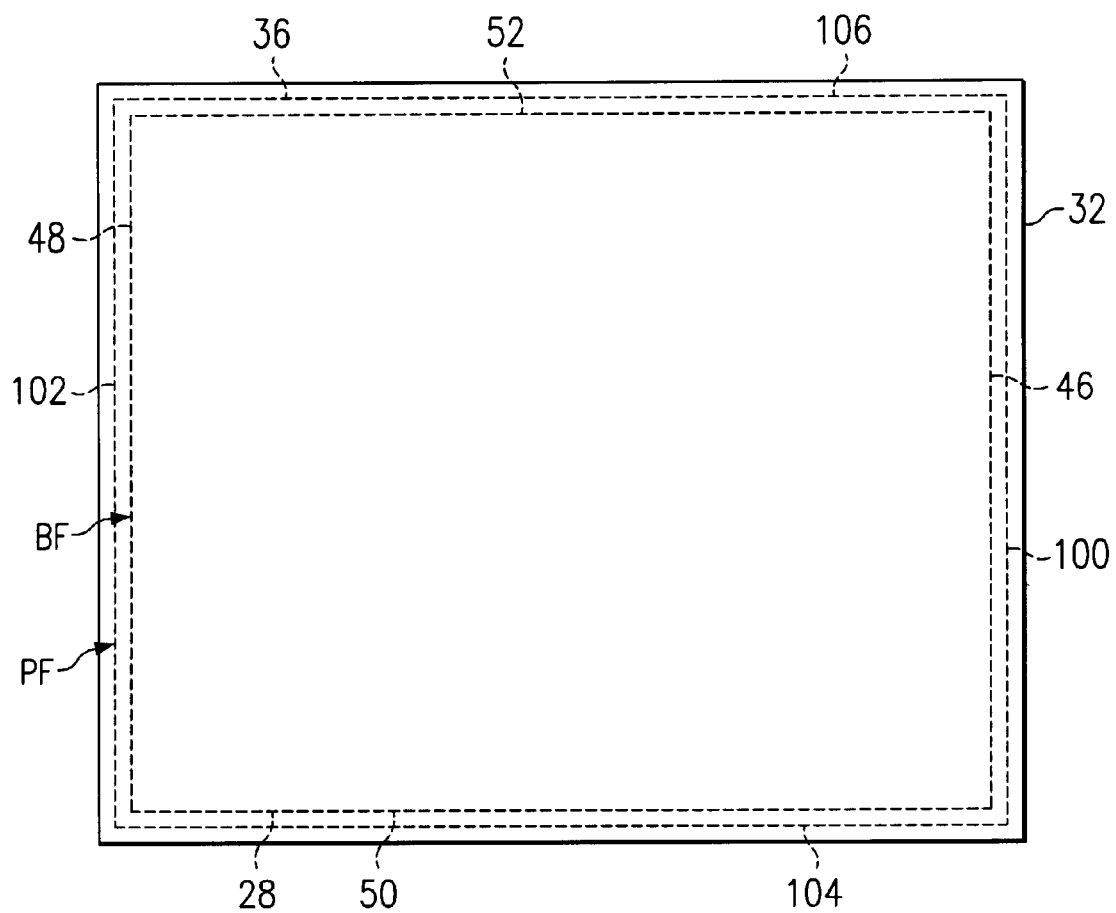
FIG. 5 is a diagrammatic view illustrating a footprint diagram of a portable computer.

In one embodiment, as shown in FIG. 5, LCD panel 36 may overhang edges of base 28. LCD panel 36 includes a right side 100, a left side 102, a front side 104, and a rear side 106. LCD panel sides 100, 102, 104, and 106 define a panel footprint designated PF. Accordingly, sides 46, 48, 50, and 52 of base 28 define a base footprint designated BF. It can be seen from FIG. 5 that the sides of the panel footprint PF overhang the sides of the base footprint BF. By overhang, is meant substantially aligned with or extending beyond the peripheral limits of an associated member.

As a result, one embodiment provides a portable computer including a base having a perimeter including a plurality of sides and a module opening formed in one of the sides. A display panel having a viewing surface is housed by a cover pivotally connected to the base for movement between an open position and a closed position. The cover includes a visor extending in a direction substantially perpendicular to the viewing surface of the display panel. The visor covers at least a portion of the module opening when the cover is in the closed position.

Another embodiment provides a computer system including a microprocessor, an input coupled to provide input to the microprocessor, a mass storage coupled to the microprocessor, a display coupled to the microprocessor by a video controller, and a memory coupled to provide storage to facilitate execution of computer programs by the microprocessor. The computer system also includes a portable computer base having a perimeter including a plurality of sides and a module opening formed in one of the sides. A display panel having a viewing surface is housed by a cover pivotally connected to the base for movement between an open position and a closed position. The cover includes a visor extending in a direction substantially perpendicular to the front surface of the display panel. The visor covers at least a portion of the module opening when the cover is in the closed position.

Yet another embodiment provides a method of providing a visor for a portable computer system. A portable computer base including a plurality of sides is formed. A module opening is provided in one of the sides of the base. A display panel having a viewing surface is mounted in a cover having a visor which extends in a direction substantially perpendicular to the viewing surface of the display panel. The cover is pivotally connected to the base for movement between an open position and a closed position, such that the visor covers a portion of the module opening when the cover is in the closed position.

As it can be seen, the principal advantages of these embodiments are that in a portable computer, a visor operates to reduce the glare on the viewable LCD panel. The visor also operates to restrain one or more modules within the base of the portable computer when the computer is dropped for example. Another advantage of these embodiments is that the visor provides additional strength to the cover of the portable computer, reducing the risk of damage to the LCD panel. A further advantage is that the visor protects the portable computer from foreign material such as dust, dirt, small objects, and liquids.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A portable computer comprising:
   a base having a perimeter including a plurality of sides;
   a module opening formed in one of the sides of the base;
   a display panel having a viewing surface;
   a cover for housing the display panel, the cover being pivotally connected to the base for movement between an open position and a closed position, and having a visor extending in a direction substantially perpendicular to the viewing surface of the display panel, wherein the visor is configured to cover a module device mounted in the base and expose an interface device mounted in the base when the cover is in the closed position; and
   a gasket disposed between the visor and the base when the cover is in the closed position.

2. The portable computer as defined in claim 1 wherein the visor completely covers the module opening when the cover is in the closed position.

3. The portable computer as defined in claim 2 wherein the visor substantially covers one of the sides of the base when the cover is in the closed position.

4. The portable computer as defined in claim 1 wherein one of the sides of the base includes an interface, and wherein the visor includes a notch positioned such that the interface remains physically accessible when the cover is in the closed position.

5. The portable computer as defined in claim 1 wherein the visor is formed of a plastic material.

6. A portable computer comprising:
   a base having a perimeter including a plurality of sides;
   a module opening formed in one of the sides of the base;
   a display panel having a viewing surface;
   a cover for housing the display panel, the cover being pivotally connected to the base for movement between an open position and a closed position, and having a visor extending in a direction substantially perpendicular to the viewing surface of the display panel, wherein the visor covers at least a portion of the module opening when the cover is in the closed position; and
   a gasket disposed between the visor and the base when the cover is in the closed position.

7. A portable computer comprising:
   a base having a perimeter including a plurality of sides;
   a module having a first end, the module being mounted in the base such that the first end is substantially flush with one of the sides of the base;
   a display panel having a viewing surface;
   a cover for housing the display panel, the cover being pivotally connected to the base for movement between an open position and a closed position, and having a visor extending in a direction substantially perpendicular to the viewing surface of the display panel, wherein the visor is configured to cover a module device mounted in the base and expose an interface device mounted in the base when the cover is in the closed position; and
   a gasket disposed between the visor and the base when the cover is in the closed position.

8. The portable computer as defined in claim 7 wherein the visor completely covers the first end of the module when the cover is in the closed position.

9. The portable computer as defined in claim 7 wherein one of the sides of the base includes an interface, and wherein the visor includes a notch positioned such that the interface remains physically accessible when the cover is in the closed position.

10. The portable computer as defined in claim 7 wherein the visor is formed of a plastic material.

11. A computer system comprising:
    a portable computer base including a plurality of sides;
    a microprocessor mounted in the base;
    an input coupled to provide input to the microprocessor;
    a mass storage coupled to the microprocessor;
    a video controller coupled to the microprocessor;
    a memory coupled to provide storage to facilitate execution of computer programs by the microprocessor;
    a module opening formed in one of the sides of the base;
    a display panel having a viewing surface;
    a cover for housing the display panel, the cover being pivotally connected to the base for movement between an open position and a closed position, and having a visor extending in a direction substantially perpendicular to the viewing surface of the display panel, wherein the visor is configured to cover a module device mounted in the base and expose an interface device mounted in the base when the cover is in the closed position; and
    a gasket disposed between the visor and the base when the cover is in the closed position.

12. The computer system as defined in claim 11 wherein the visor completely covers the module opening when the cover is in the closed position.

13. The computer system as defined in claim 12 wherein the visor substantially covers one of the sides of the base when the cover is in the closed position.

14. The computer system as defined in claim 11 wherein one of the sides of the base includes an interface, and wherein the visor includes a notch positioned such that the interface remains physically accessible when the cover is in the closed position.

15. The computer system as defined in claim 11 wherein the visor is formed of a plastic material.

16. A method of providing a visor for a portable computer system comprising the steps of:
    providing a portable computer base including a plurality of sides;
    providing a module opening in one of the sides of the base;
    mounted a display panel, having a viewing surface, in a cover having a visor, the visor extending in a direction substantially perpendicular to the viewing surface of the display panel;
    pivotally connecting the cover to the base for movement between an open position and a closed position, such that the visor covers at least a portion of the module opening when the cover is in the closed position;
    configuring the visor to cover a module device mounted in the base and expose an interface device mounted in the base when the cover is in the closed position; and
    positioning a gasket between the visor and the base when the cover is in the closed position.

* * * * *